March 26, 1957 E. L. MAYO 2,786,633
THERMOSTATIC VALVE WITH SOLID ACTUATOR MEMBER
Filed Jan. 4, 1955 2 Sheets-Sheet 1

INVENTOR.
Edward L. Mayo
BY
Brown, Jackson, Boettcher & Dienner
Attys.

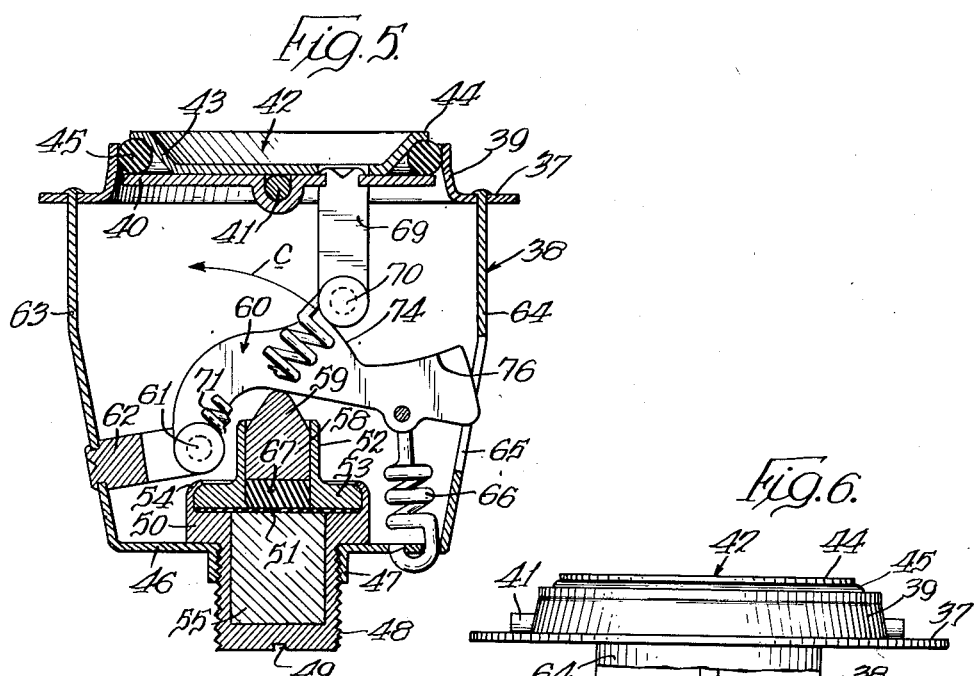
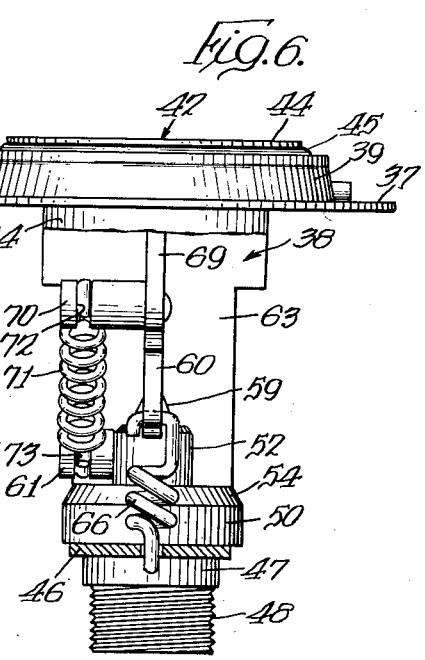
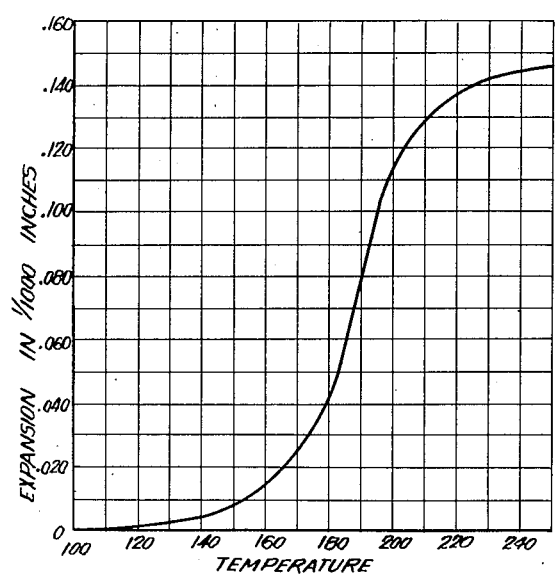

United States Patent Office 2,786,633
Patented Mar. 26, 1957

2,786,633

THERMOSTATIC VALVE WITH SOLID ACTUATOR MEMBER

Edward L. Mayo, Cleveland, Ohio, assignor to The Bishop & Babcock Manufacturing Company, Cleveland, Ohio, a corporation of Ohio Application January 4, 1955, Serial No. 479,805

8 Claims. (Cl. 236—34)

This invention relates to valves for use in controlling the flow of liquids, and has to do with thermostatic valves employing as the motive power agent for opening the valve a normally solid member expansible and contractible responsive to temperature variation.

It is well known to provide, in unsealed internal combustion engine cooling systems, thermostatic valves for preventing flow of coolant to the radiator until the coolant reaches a predetermined high temperature, at which time the valve opens permitting flow of coolant to the radiator in the continued operation of the engine. The known valves are of two types—first, one in which the valve member has rectilineal movement and, second, one in which the valve member swings about a transverse axis, i. e. a butterfly type. In both types the valve member, when closed seats on a seat member or means which positively limits movement of the valve member in closing direction. The valve member, in the known valves, usually is actuated by a bellows and associated spring means and fails safe, i. e., upon failure of the bellows the valve member opens or remains open to permit effective flow of coolant to the radiator and thereby guard against injurious overheating or burning of the engine.

In certain cases, the known thermostatic valves above referred to, when used in sealed cooling systems, show variation in predetermined starting temperature and are not entirely satisfactory in that respect.

It is also known to use, in sealed cooling systems, a valve in which the valve member is urged in closing direction by spring means and is moved in opening direction by a normally solid actuating member expansible and contractible responsive to increase and decrease in temperature of the coolant. In that valve the valve member, when closed, seats against seat means which positively prevents movement of the valve member in closing direction beyond fully closed position. This valve is therefore unsatisfactory, because it remains closed upon failure and can not fail safe, even though it possesses adequate operating power to overcome the pressures encountered in a sealed cooling system.

My invention is directed to a thermostatic valve comprising a valve member movable in one direction to open position and normally movable in the opposite direction to closed position only, the valve member upon failure of the valve being movable in such opposite direction beyond closed position to a second and abnormal open position so as to fail safe. More particularly I provide a thermostatic valve which retains the advantages of the known valves having a solid valve opening member while possessing the additional advantage of failing safe. To that end I provide a valve member normally movable in closing direction to closed position only and moved to open position by a normally solid operating member when the engine coolant is at a predetermined high temperature. I also provide means cooperating with the solid valve opening member for normally holding the valve member closed, when the engine coolant is at the desired predetermined low temperature, and effective for moving the valve member a further distance in normally closing direction beyond closed position to an open position, upon failure of the valve due to failure of the valve opening member. Further objects and advantages of my invention will appear from the detail description.

In the drawings:

Figure 5 is a sectional view, on an enlarged scale, taken substantially on line 5—5 of Figure 4, certain parts being shown in elevation;

Figure 6 is a side view of the valve of Figure 5 with the nearer arm of the supporting frame broken away; and Figure 7 is a graph of the temperature response of a solid valve actuating member used in the valve of my invention.

Figure 1:
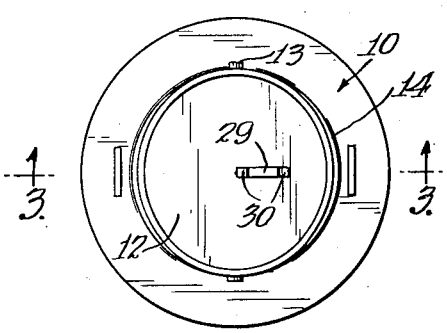
Figure 1 is a plan view of a thermostatic valve embodying my invention.

The valve of my invention, in its broader aspects, may be used for various purposes, though it is particularly suitable for use in the cooling system of an automobile engine and will be described, by way of example, as used for that purpose. It comprises a valve seat member 10 in the form of an annular plate for mounting the valve assembly in the cooling system of an internal combustion engine, such as the engine of an automotive vehicle, in a known manner. A supporting frame 11 of substantially U shape is secured to and depends from the seat member 10. A valve member 12 of generally disc shape is pivotally mounted for turning movement about a transverse axis on a pivot rod 13 suitably secured, conveniently by soldering, to the underface of valve member 12 and pivoted at its ends in an upwardly extending seat element 14 of seat member 10. The valve member 12 is of slightly elliptical shape, with its longer axis paralleling its pivot axis. The seat element is so formed and of such height that the valve member 12 may turn in opening direction—counter-clockwise as viewed in Figure 3—a distance corresponding to the initial expansion of the solid actuating member during warming up of the engine while maintaining a sufficiently close fit for practical purposes with the seat element 14, as will appear more fully later. Thereafter, the valve member may turn to full open position, responsive to heating of the coolant to a predetermined high temperature and corresponding expansion of the solid actuating member. When the engine is not in operation and is cold, the valve member 12 is at approximately its position shown in full lines in Figure 3, though it may be turned clockwise a short distance beyond that position on an inclination but still providing a sufficient closure with seat element 14, turning of valve member 12 clockwise beyond that position normally being prevented by the solid actuating member. Further, upon failure of the valve and loss of the material of the solid actuating member, the valve member 12 is turned a further distance in normal closing direction to a second and abnormal open position, thereby assuring that the valve will fail safe, as will be explained more fully presently.

A cylindrical cup shaped casing 15, provided at its upper end with an outer circumferential flange 16, seats in an opening in the lower or bight portion 17 of the supporting frame 11. The upper end of casing 15 is closed by a diaphragm 18 of suitable elastic material, such as rubber or other suitable material. A tubular guide member 19 is provided at its lower end with an outer circumferential flange 20 which seats upon the upper face of the peripheral portion of diaphragm 18, Flange 16 is provided with a relatively thin upward extension 16a extending about and over flange 20 of guide member 19 and compressed tightly thereabout so as to secure the parts together and hold the diaphragm 18 tightly clamped upon flange 16, forming therewith a seal tight closure at the upper end of casing 15. The casing 15 and the guide member 19 may be disposed coaxially with the valve member 12 as shown.

The casing 15, closed at its upper end by the diaphragm 18, defines an expansion chamber in which is disposed a pressure generating or motive power member 21. The member 21 normally is solid and is expansible and contractible responsive to increase and decrease in temperature. A motive power or pressure generating member well suited for the purposes of my invention may be formed of a suitable commercial wax compounded in accordance with known formulae. Preferably, though not necessarily, I use a wax which has a rather slow rate of expansion in the temperature range of from about 100° F. to 160° F., the rate of expansion increasing substantially and abruptly at about 165° F. and continuing to about 200° F., the wax fusing between 190° F. and 200° F. and the rate of expansion with further increase in temperature then rapidly decreasing. The particular wax used will depend upon requirements, as will be understood, and may be compounded accordingly by known commercial processes. In a sealed automobile cooling system, in general, the thermostatic valve should start to open at approximately 158° F. to 160° F. and should be fully open at approximately 185° F. to 190° F. Assuming that member 21 is formed of the wax stated, it remains solid at temperatures below about 190° F. The member 21 is formed under substantial pressure—approximately 1000 p. s. i.—sufficient to eliminate any voids and squeeze out any trapped air or gases, so as to produce a cylindrical solid homogeneous body or member 21 of a size, at normal room temperature, to fill completely the casing 15. The contraction of member 21 in the temperature range between approximately 100° F. and normal room temperature, about 70° F., is negligible and may be disregarded.

A pressure transmitting member 24, in the form of a thrust rod or plunger, is slidably mounted in the guide member 19. The plunger 24 is formed in two sections 25 and 26 threaded into a sleeve 27, for adjusting the effective length of plunger 24 to give the desired initial setting of valve member 12, after which the sections 25 and 26 may be fixedly secured in sleeve 27 in any suitable manner. The plunger or rod 24 has at its upper end a head 28 which is diametrically slotted from its upper end to receive the inner end portion of a vertically disposed plate 29 of rectangular shape seating at its upper edge against the under face of valve member 12 and secured thereto in a suitable manner, conveniently by soldering, the plate 29 being further secured by elements 30 extending from the upper edge thereof through valve member 12 and having their upper ends peened over thus riveting plate 29 to valve member 12. Head 28 of rod 24 is pivoted to plate 29 by a pin 31 passing through plate 29 and through aligned lengthwise slots 28a in head 28. The axis of pin 31 is disposed a short distance to one side of, and parallel with, the pivot axis a of valve member 12, the pivot rod 13 being provided at its midlength with an offset 13a to accommodate the inner end portion of plate 29. A tension coil spring 32 has its upper end hooked through plate 29 adjacent the outer end thereof, this spring 32 seating in the frame 11 and being anchored thereto by tabs 33 struck inwardly from the arms of frame 11 and engaging over the lowermost coil of spring 32. Preferably, plunger 24 seats at its lower end on a rubber disc 34 of substantial thickness, which fits snugly in guide member 19 and seats on the upper face of diaphragm 18. The disc 34 provides, in cooperation with guide member 19, seal means effective for preventing access to diaphragm 18 of antifreeze solution or other solutions contained in the engine cooling system and which might be injurious to diaphragm 18.

Normally the pressure generating or motive power member 21 is solidified and fills the casing 15, restraining the diaphragm 18 against downward movement, thereby restraining rod or plunger 24 against downward movement. As is shown more clearly in Figure 3, the axis of pin 31 is disposed but a slight distance outward from the pivot axis a of the valve member 12 and is located between the latter axis and the attachment of spring 32 to plate 29. The spring 32 urges valve member 12 in clockwise direction about axis a and returns it to its fully closed position shown, when the coolant of the engine cooling system is at a temperature of approximately 100° F. The member 21 then effectively prevents clockwise turning of valve 12 under the influence of spring 34 beyond its fully closed position. As the temperature of the coolant increases, incident to warming up of the engine, member 21 expands and turns valve member 12 counter-clockwise in opening direction. The rate of expansion of member 21 during increase in temperature to about 160° F. is rather slow and the valve member 12 is turned but a short distance in opening direction. The rate of expansion of member 11 increases substantially and abruptly at about 165° F. and continues to about 200° F. The height of seat element 14 is such that valve member 12 maintains closure therewith until it has been turned in opening direction a distance corresponding to the extent of expansion of member 21 at a temperature of about 158° F. to 160° F. At the latter temperature valve member 12 passes beyond seat element 14 and starts to open and is then rapidly turned to its full open position, indicated in broken lines in Figure 3, due to the accelerated rate of expansion of member 26. As valve member 12 approaches full open position, with the coolant at a temperature of about 185° F. to 190° F., the member 21 fuses and the rate of expansion thereof rapidly falls off to a negligible value, so that valve member 12 remains in full open position as long as that temperature obtains. When the temperature of the coolant is lowered, member 21 contracts and valve member 12 is turned in closing direction to the extent required to maintain the coolant at the desired temperature. In that manner, valve member 12 is opened and is thereafter moved in closing or opening direction as circumstances may require. When the coolant reaches a low temperature of approximately 100° F., due to stoppage of the engine or other cause, the valve member 12 normally is returned to fully closed position by spring 32, as permitted by contraction of the member 21.

In the event of casing 15 developing an opening, due to corrosion or other causes, loss of the material of the member 21, particularly if in its fused or liquid condition, will occur. In such case the diaphragm 18 will be free to flex downwardly within casing 15 to a material extent, such as to permit downward movement of rod 24 a substantial distance beyond the position which it occupies when the valve member 12 is in its closed position. Under such conditions, the pressure generating or motive power member 21 fails and tension spring 32 then becomes effective for turning the valve member 12 in clockwise direction about its axis a from its closed position to a second and abnormal open position, indicated in dot and dash lines in Figure 3, thus permitting flow through the valve of the coolant. That assures that if the valve fails it will fail safe so as to permit flow of coolant to the radiator and avoid the risk of dangerous overheating of the engine with possible serious damage.

Figure 4:
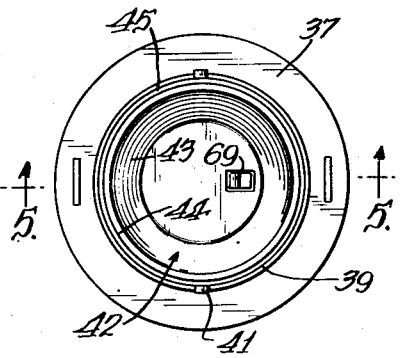
Figure 4 is a plan view of a modified form of valve embodying my invention.

The modified form of valve shown in Figures 4, 5 and 6 comprises a seat member 37 to which is secured a substantially U-shaped depending supporting frame 38. Seat member 37 is provided with an upwardly extending seat element 39 within which is pivotally mounted a disc valve member 40 by means of a transverse pivot rod 41 suitably secured thereto and pivoted, at its ends, in element 39. A retainer plate 42 is secured to the upper face of valve member 40 concentric therewith in a suitable manner, conveniently by soldering. The plate 42 has an upwardly and outwardly inclined rim portion 43 terminating in a relatively short element 44 parallel with valve member 40. The latter member and the retainer plate 42 thus define between them a channel which receives an O sealing ring 45 of suitable elastic material resistant to water and solutions such as are commonly used in engine cooling systems. In the normal closed position of valve member 40 the sealing ring 45 contacts seat element 39 under appreciable pressure providing therewith a liquid tight closure. The sealing ring 45, while providing an effective seal with the seat element 39, does not interfere to objectionable extent with turning of valve member 40 in either direction about the axis of pin 41. In the normal intended use of the valve, the valve member 40 remains in its closed position until the coolant reaches a temperature of approximately 160°, at which temperature the valve member 40 turns counterclockwise, as viewed in Figure 5, to open position and continues turning in that direction so long as the temperature of the coolant increases, valve member 40 being moved to full open position when the temperature of the coolant is at approximately 180° F. Thereafter, the valve member 40 may move in either closing or opening direction as required to maintain the coolant at the desired operating temperature, approximately 180°. When the temperature of the coolant drops to approximately 158° to 160° F., due to stoppage of the engine or other cause, the valve member 40 is returned to closed position and normally remains there until the temperature of the coolant again increases, as when the engine is again started. The valve member 40 is thus turned in counterclockwise direction to open position and is turned in clockwise direction to closed position, as viewed in Figure 5, turning of valve member 40 clockwise beyond its normal closed position being prevented, under normal conditions, by means to be described presently.

The bight portion 46 of supporting frame 38 is provided with a central downwardly extending and interiorly threaded neck 47. A cylindrical casing 48, exteriorly threaded, screws into neck 47 for adjustment therethrough. The casing 48 is provided in its lower end with a transverse slot or kerf 49 for reception of the blade of a screw driver or other tool for convenience in adjusting casing 48. At its upper end casing 48 is provided with an outwardly extending circumferential flange 50 on the upper face of which seats the outer portion of a diaphragm 51 formed of rubber or other suitable elastic material. A guide member 52 extends upwardly from casing 48 concentrically therewith and is provided with an outer circumferential base flange 53 seating upon the circumferential portion of diaphragm 51. Flange 50 of casing 48 is provided with a relatively thin upward extension 54 which extends about flange 53 of guide member 52 and is pressed tightly downwardly thereover so as to clamp the circumferential portion of diaphragm 51 between flanges 50 and 53 providing therewith a fluid tight seal. The casing 48, closed at its upper end by the diaphragm 51, provides a housing which receives a normally solid pressure generating or actuator member 55. The member 55 may be formed of wax, such as the wax previously referred to, or of any other suitable material. Member 55 is solid at normal room temperature, about 70° F., and may have a fusion temperature of approximately 190° F. The actuator member 55 normally is solid, as noted, and at normal room temperature completely fills the housing within the casing 48.

A plunger 58 is slidably mounted in guide member 52 and is provided at its upper end with a rounded nose 59 which contacts the lower edge of a cam lever 60 pivoted at one end, by a pin 61, in the slotted inner end of a post 62 secured to and extending inwardly from one arm 63 of the supporting frame 38. The other arm 64 of frame 38 is provided with a slot 65 which receives the other end of lever 60. A tension spring 66 is anchored at its upper end to lever 60 a short distance from arm 64 of frame 38 and is anchored at its lower end to bight portion 46 of frame 38. The tension spring 66 maintains the lower edge of lever 60 in pressure contact with nose 59 of plunger 58, the lower end of which seats on a rubber disc 67 fitting snugly within guide member 52 and seating upon the central area of the diaphragm 51. The disc 67 provides, in cooperation with guide member 52, seal means effective for preventing access to diaphragm 51 of coolant which might contain solutions injurious to the diaphragm 51.

A finger 69 is secured to valve member 40 to one side of pivot rod 41 and extends downward therefrom. A pin or stud 70 is fixed in the lower end of finger 69 and projects to one side thereof, pin 61 also projecting to one side of post 62 so as to be aligned with stud 70. A tension spring 71 is anchored at its upper end in a circumferential groove 72 in stud 70 and at its lower end in a circumferential groove 73 in pin 61. Tension spring 71 urges the valve member 40 clockwise in closing direction, turning of the valve member beyond its closed position shown in Figure 5 normally being prevented by contact of stud 70 with shoulder 74 of cam lever 60. In that connection, under normal operating conditions when the valve member 40 is closed the pressure generating member or actuator 55 is solidified and positively prevents downward movement of plunger 58 beyond its position shown in Figure 5. The plunger 58 is then effective for preventing downward movement of cam lever 60 beyond its position shown thereby positively preventing clockwise turning of valve member 40 beyond its full closed position.

The cam lever 60 is provided with a dwell area 76 extending outward from the lower end of shoulder 74 and inclined upward. The shoulder 74 is substantially concentric with the axis of pivot pin 61, about which the cam lever 60 turns, and moves through an arcuate path indicated by the curved arrow c in the movements of cam lever 60. During warming up of the engine the actuator 55 expands responsive to increasing temperature of the coolant and forces the plunger 58 upward, swinging cam lever 60 in counter-clockwise direction. During the first part of such upward movement of cam lever 60 shoulder 74 thereof passes beneath the stud 70 without exerting effective upward pressure thereon and the valve member 40 remains closed. That condition obtains until the coolant has been heated to a predetermined temperature, approximately 160° F., at which it is desired to have the valve member 40 open. At the end of such period, the dwell area 76 of cam lever 60 contacts stud 70 and exerts effective upward pressure thereon thereby turning valve member 40 counter-clockwise beyond the seat element 39. Thereafter, as the temperature of the coolant increases the actuator 55 expands and cam lever 60 is turned a further distance in counter-clockwise direction at an increased rate until the valve 40 is turned to its full open position, which occurs at approximately 190° F. In that connection, when the cam lever 60 has been turned to a position such that stud 70 is at the lower end of shoulder 74, the cam lever is inclined upward and the rate of turning thereof is accelerated so that the rate of opening of the valve member 40 is also accelerated. Due to the provision of the cam lever 60, shaped in the manner described, the actuator member 55 may be formed of beeswax or of any suitable material which expands and contracts at a substantially uniform rate responsive to increase and decrease in temperature, though I preferably use the wax composition having the characteristics shown in the graph of Figure 7. After the valve member 40 has been opened in the manner described, it may be moved in closing direction and in opening direction responsive to variations in temperature of the coolant so as to maintain the latter at the desired operating temperature. Also, the valve member 40 is not necessarily moved to its full open position at all times, the extent of opening and closing thereof being determined by variations in temperature of the coolant, as will be understood.

In the event of failure of the valve with resultant loss of the material of the actuator member 55, due to leakage resulting from an opening due to corrosion or other causes, the actuator member 55 is no longer effective for preventing downward movement of plunger 58. The plunger 58 may then move downward under the pressure exerted thereon by the cam lever 60 under the influence of tension spring 66. The cam lever 60 then swings downward in clockwise direction and shoulder 74 passes beneath the stud 70 releasing the latter which is then pulled toward pivot pin 61 by the tension spring 71 into such position that finger 69 is aligned with tension spring 71 and pin 61, thus turning the valve member 40 clockwise beyond its normal closed position into a second and abnormal open position which permits free flow of the coolant through the seat element 39. That assures that the valve will fail safe and effectively guards against overheating and resultant damage to the engine in the event of valve failure.

Figure 2:
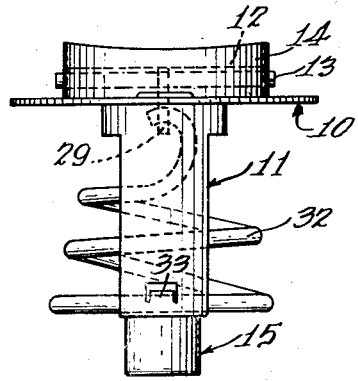
Figure 2 is a side view of the thermostatic valve of Figure 1.
Figure 3:
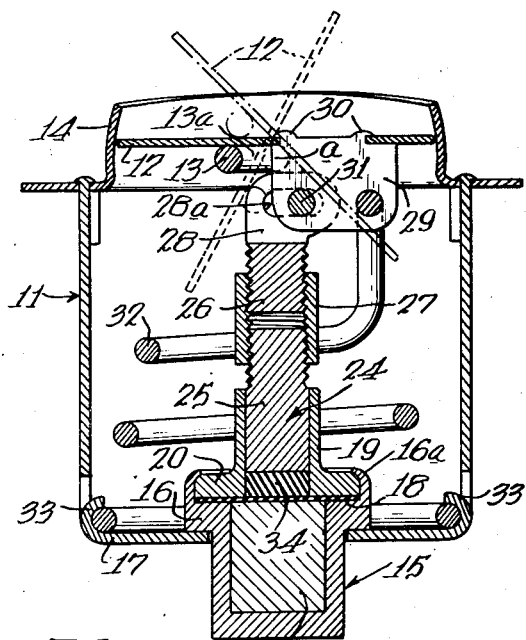
Figure 3 is a sectional view, on an enlarged scale, taken substantially on line 3—3 of Figure 1, certain parts being shown in elevation.

While the valve of Figures 1 to 3, inclusive, maintains a sufficiently tight closure during the warming up period adequate for most purposes, there may be cases in which a more efficient or tighter closure may be desirable, in which cases the valve of Figures 4 to 6, inclusive, is preferred. In that connection, it is to be noted that while the valves of my invention are particularly suitable for use in cooling systems for internal combustion engines, such as automobile engines, they may be used for various purposes, within the broader aspects of my invention. A further advantage of the valve of Figures 4 to 6, inclusive, is that by having the cam lever 60 of appropriate contour satisfactory results may be attained by using an actuator member formed of a wax or other suitable material not having the characteristics of the wax above referred to and the characteristics of which are shown in the graph of Figure 7. Also, in the valve of Figures 1 to 3, inclusive, other materials or waxes may be used for the actuator member, though in that form I preferably use the wax having the characteristics of the graph of Figure 7, for the reasons previously stated.

It will be understood that changes in detail may be resorted to without departing from the field and scope of my invention, and I intend to include all such variations, as fall within the scope of the appended claims, in this application in which the preferred forms only of my invention have been disclosed.

I claim:

1. In thermostatic valve means, a unit adapted to be mounted within the cooling system of an internal combustion engine to be there exposed to the engine coolant, said unit comprising a valve seat member, a valve member cooperating with said seat member pivoted on a transverse axis for turning movement in one direction to a first and normal open position and in the opposite direction to a closed position, said valve member clearing said seat member for movement in said opposite direction beyond closed position to a second and abnormal open position upon failure of said valve means, thermo-responsive pressure applying means carried by said seat member and connected to said valve member effective for turning it in said one direction responsive to a predetermined high temperature and normally restraining said valve member against turning in said opposite direction beyond said closed position, said pressure applying means upon failure releasing said valve member for turning thereof to said second and abnormal open position, and yielding means carried by said seat member and urging said valve member in said opposite direction and effective for turning said valve member to said second and abnormal open position responsive to failure of said pressure applying means.

2. In thermostatic valve means, a unit adapted to be mounted within the cooling system of an internal combustion engine to be there exposed to the engine coolant, said unit comprising a valve seat member, a valve member cooperating with said seat member pivoted on a transverse axis for turning movement in one direction to a first and normal open position and in the opposite direction to a closed position, said valve member clearing said seat member for movement in said opposite direction beyond closed position to a second and abnormal open position upon failure of said valve means, pressure applying means carried by said seat member and connected to said valve member effective for turning it in said one direction, said pressure applying means comprising a motive power member expansible and contractible in the opening and closing temperature range of said valve member, said motive power member restraining said valve member against movement in said opposite direction beyond closed position, and yielding means carried by said seat member and urging said valve member in said opposite direction and effective for turning said valve member to its said second and abnormal open position upon failure of said motive power member.

3. In thermostatic valve means, a unit adapted to be mounted within the cooling system of an internal combustion engine to be there exposed to the engine coolant, said unit comprising a valve seat member, a valve member cooperating with said seat member pivoted on a transverse axis for turning movement in one direction to a first and normal open position and in the opposite direction to a closed position, said valve member clearing said seat member for movement in said opposite direction beyond closed position to a second and abnormal open position upon failure of said valve means, a sealed casing carried by said seat member having a movable wall and defining an expansion chamber, a normally solid motive power member in said casing expansible and contractible in the opening temperature range of said valve member, a pressure transmitting connection between said valve member and said wall effective for turning said valve member in said one direction responsive to outward movement of said wall, said motive power member restraining said valve member against turning movement in said opposite direction beyond closed position, and yielding means carried by said seat member and urging said valve member in said opposite direction and effective for turning it to its said second and abnormal open position responsive to escape from said casing of the material of said motive power member.

4. In thermostatic valve means, a unit adapted to be mounted within the cooling system of an internal combustion engine to be there exposed to the engine coolant, said unit comprising a valve seat member, a valve member cooperating with said seat member pivoted on a transverse axis for turning movement in one direction to a first and normal open position and in the opposite direction to a closed position, said valve member clearing said seat member for movement in said opposite direction beyond closed position to a second and abnormal open position upon failure of said valve means, a supporting frame secured to and depending from said seat member, a sealed casing mounted in said frame restrained thereby against downward movement, said casing having a movable upper wall and defining an expansion chamber, a normally solid motive power member in said casing expansible and contractible in the opening temperature range of said valve member, a pressure transmitting member seating at its lower end on said wall and connected at its upper end to said valve member effective for turning the latter in said one direction responsive to outward movement of said wall, said motive power member restraining said valve member against turning movement in said opposite direction beyond closed position, and yielding means mounted on said frame and urging said valve member in said opposite direction and effective for turning it to its said second and abnormal open position responsive to escape from said casing of the material of said motive power member.

5. In thermostatic valve means, a unit adapted to be mounted within the cooling system of an internal combustion engine to be there exposed to the engine coolant, said unit comprising a valve seat member, a valve member cooperating with said seat member pivoted at its midportion on a transverse axis for turning movement in one direction to a first and normal open position and in the opposite direction to a closed position, said valve member clearing said seat member for movement in said opposite direction beyond closed position to a second and abnormal open position upon failure of said valve means, a supporting frame secured to and depending from said seat member, a sealed casing mounted in said frame restrained thereby against downward movement, said casing having a movable upper wall and defining an expansion chamber, a normally solid motive power member in said casing expansible and contractible in the opening temperature range of said valve member, a tubular guide member extending upward from said casing, a thrust rod slidably mounted in said guide member seating at its lower end on said wall and pivotally connected at its upper end to said valve member on an axis parallel with and to one side of the pivot axis of said valve member, and a tension spring mounted on and anchored at its lower end to said frame and attached at its upper end to said valve member, the connection between said thrust rod and said valve member being disposed between the pivot axis of said valve member and the point of attachment thereto of said tension spring.

6. In thermostatic valve means, a unit adapted to be mounted within the cooling system of an internal combustion engine to be there exposed to the engine coolant, said unit comprising a valve seat member, a valve member cooperating with said seat member pivoted at its midportion on a transverse axis for turning movement in one direction to a first and normal open position and in the opposite direction to a closed position, said valve member clearing said seat member for movement in said opposite direction beyond closed position to a second and abnormal open position upon failure of said valve means, a supporting frame secured to and depending from said seat member, thermo-responsive pressure applying means carried by said frame and pivotally connected to said valve member to one side of the pivot axis thereof and effective for turning it in said one direction responsive to a predetermined high temperature and normally restraining said valve member against turning in said opposite direction beyond said closed position, and a tension spring carried by and anchored at its lower end to said frame and attached at its upper end to said valve member, the connection of said pressure applying means to said valve member being between the pivot axis of the latter and the point of attachment of said spring to said valve member, said spring being effective for turning said valve member in said opposite direction to its said second and abnormal open position upon failure of said pressure applying means.

7. In thermostatic valve means, a unit adapted to be mounted within the cooling system of an internal combustion engine to be there exposed to the engine coolant, said unit comprising a valve seat member, a cooperating valve member having a closed position and pivoted and free for turning movement from said closed position in either direction, thermostatic means carried by said seat member for turning said valve member in one direction to a normal open position while restraining it against turning movement in the opposite direction beyond said closed position, and yielding means carried by said seat member effective for turning said valve member in said opposite direction to said closed position under control of said thermostatic means and for turning said valve member in said opposite direction to a second and abnormal open position responsive to failure of said thermostatic means.

8. In thermostatic valve means, a unit adapted to be mounted within the cooling system of an internal combustion engine to be there exposed to the engine coolant, said unit comprising a valve seat member, a cooperating valve member having a substantially horizontal closed position and pivoted and free for turning movement from said closed position in either direction to a substantially vertical position, a thermostat member carried by said seat member, a valve operating member interposed between said thermostat member and said valve member effective for turning the latter in one direction to a normal open position while normally restraining turning of said valve member in the opposite direction beyond said closed position, and yielding means carried by said seat member effective for turning said valve member in said opposite direction to said closed position under control of said thermostat member and for turning said valve member in said opposite direction to a second and abnormal open position responsive to failure of said thermostat member.

References Cited in the file of this patent

UNITED STATES PATENTS

| 1,752,116 | Smith | Mar. 25, 1930 |
| 1,763,802 | Levy | June 17, 1930 |
| 2,115,501 | Vernet | Apr. 25, 1938 |
| 2,323,533 | Giesler | July 6, 1943 |
| 2,656,113 | Drapeau | Oct. 20, 1953 |
| 2,657,896 | Muller | Nov. 3, 1953 |

FOREIGN PATENTS

| 151,541 | Austria | Nov. 25, 1937 |
| 534,978 | Great Britain | Mar. 25, 1941 |